Oct. 2, 1956

B. Y. CONNELL 2,765,018

SELF-SEALING ARTICLE

Filed June 4, 1952

Inventor
Balfour Y. Connell
By Robert W. Furlong
Atty.

United States Patent Office 2,765,018
Patented Oct. 2, 1956

2,765,018

SELF-SEALING ARTICLE

Balfour Y. Connell, Keokuk, Iowa, assignor to The B. F. Goodrich Company, New York, N. Y., a corporation of New York Application June 4, 1952, Serial No. 291,728

14 Claims. (Cl. 152—347)

This invention relates to a self-sealing article and is particularly concerned with a self-sealing article such as a tube for a pneumatic tire, tubeless tire, and the like, having one or more self-sealing layers and a method of making the same.

An object of this invention is to provide an article which is self-sealing upon being punctured and particularly to provide a pneumatic article having a single self-sealing layer.

Another object is to provide a rubbery composition for the single self-sealing layer which will not crack or dry out during use at elevated temperatures and will still retain its self-sealing properties.

Still another object is to provide a rubbery composition which will resist plastic flow and permit the use of a single unconfined sealing layer in articles such as tire tubes, and tubeless tires which are subject to large centrifugal forces in use.

A further object is to provide a single self-sealing rubbery composition which will permit the single self-sealing layer to be constructed as a relatively thin layer and yet provide adequate sealing properties without increasing unduly the weight or cost of the article.

Other objects will be apparent from the description and drawing which follow.

I have discovered that the foregoing objects may be achieved by employing as the self-sealing composition in such an article a partially cured "Butyl" rubber, a curing or vulcanizing agent, an auxiliary curing agent, and black iron oxide.

The invention can be employed in any article where self-sealing properties are necessary or desirable and is particularly useful in the construction of pneumatic articles subject to puncture, to centrifugal forces tending to cause plastic flow of the sealant and to heating while in use. The invention will be described in detail with reference to a few preferred embodiments as illustrated in the accompanying drawings in which Fig. 1 is a view in elevation of a tire tube having a single self-sealing layer in accordance with this invention, a portion thereof being broken away and in section for clarity of illustration;

Figure 1:
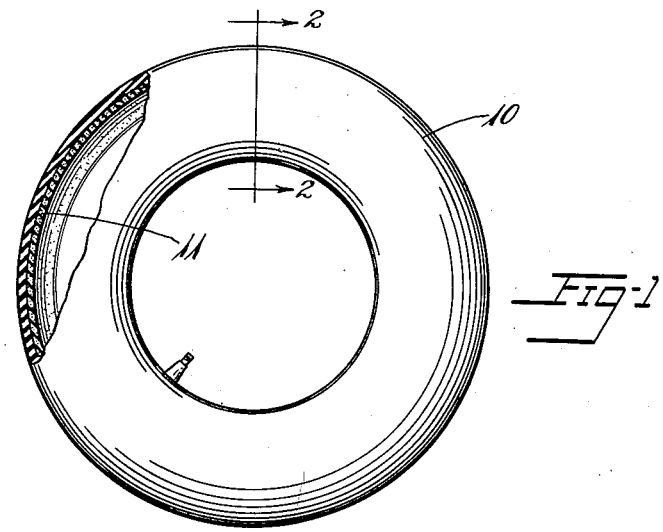
Figure 2:
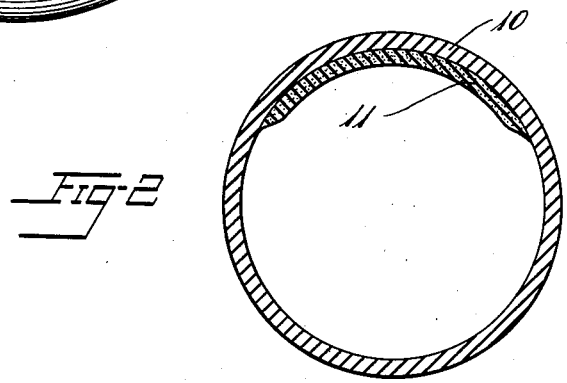
Fig. 2 is a section on line 2—2 of Fig. 1.

An inner tube embodying this invention as shown in Figs. 1 and 2 comprises a tube wall 10 of a vulcanized rubber with a single self-sealing layer 11 positioned inside the crown portion of the tube and adhered to tube wall 10 around the entire circumference of the crown portion. The tube is provided with a valve stem as is conventional. Tube wall 11 comprises any conventional vulcanized rubber composition, while sealing layer 11 comprises the composition of this invention which will hereinafter be described in more detail.

The self-sealing layer 11 may overlie the entire inner surface of tube wall 10 but preferably is used only in the tread or crown portion of the tube for this is the region in which the tube is most likely to be punctured. The sealing layer is preferably from 0.1 inch to 0.3 inch thick although a layer up to 0.5 inch in thickness can be used. A layer less than 0.1 inch thick does not, in general, seal satisfactorily for practical purposes while a layer thicker than 0.3 inch adds undesirable weight to the tube.

An inner tube embodying this invention may be built by any of the well-known methods of building multiple ply tubes. The sealing layer is preferably adhered to the tube wall by means of a suitable cement, preferably a vulcanizable cement comprising a "Butyl" rubber dissolved in a suitable solvent, particularly to insure proper positioning of the component parts until vulcanization of the composite article has been effected. The adhesion between the tube wall and sealing layer must be sufficient to prevent separation of the layers during service and for this reason it is sometimes desirable to use a binder layer to bond the sealing layer to the wall. A suitable cement may be used as the binder, but preferably a partially vulcanized "Butyl" rubber composition is interposed in a thin layer between the sealing layer and the wall, then vulcanization of this thin layer together with the wall of the tube is completed to give a unitary structure.

Figure 3:
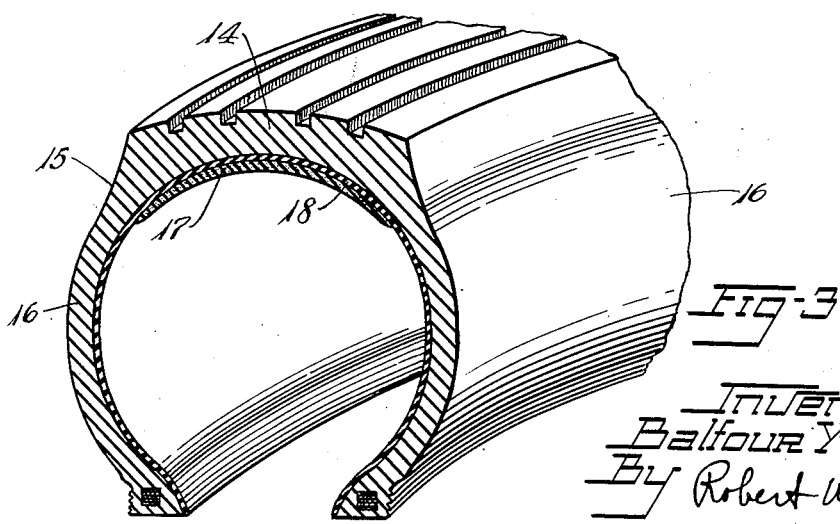
Fig. 3 is a fragmentary sectional perspective view of a tubeless tire embodying this invention.

The invention is also particularly applicable for use in a so-called tubeless tire as illustrated in Fig. 3 which comprises the usual tread 14, carcass 15, and side wall portions 16, 16 and has a sealing layer 17 positioned inside the carcass of the tire adjacent the crown portion. In the case of the tubeless tire it is desirable to employ a barrier layer or lining 18 impermeable to air extending along the inner face of the carcass from bead portion to bead portion. Barrier layer 18 desirably consists of a vulcanized "Butyl" rubber composition. Sealing layer 17, barrier 18, and carcass 15 may all be adhered together by any suitable adhesive composition, as is well known to the art. The carcass portion and tread portion of the tire may be of conventional construction utilizing natural or synthetic rubber.

As in the case of a tire tube the use of a partially vulcanized "Butyl" rubber sealing layer permits a simple construction to be used, involving but a single sealing layer which is positioned on the inner surface of the tire rather than being disposed between two stiffer layers. If desired, of course, the sealing composition of this invention may be confined between two other layers, or a plurality of layers of sealing composition may be interleaved between layers of other material, but as pointed out above, such a practice is unnecessary.

The term "Butyl" rubber as used herein is intended to include rubbery copolymers of a major proportion, i. e., over 50% by weight, of an isoolefin having from 4 to 7 carbon atoms with a minor proportion by weight of an open-chain conjugated diolefin having from 4 to 8 carbon atoms, and preferably a rubbery copolymer of a major proportion of isobutylene with a minor proportion of isoprene. It is preferred that the copolymer consist of from 70 to 99½ parts by weight of an isomonoolefin such as isobutylene or ethyl methyl ethylene copolymerized with from ½ to 30 parts by weight of an open-chain conjugated diolefin such as isoprene; butadiene-1,3; piperylene; 2,3-dimethyl-butadiene-1,3; 1,2 - dimethyl-butadiene-1,3 (3-methyl pentadiene-1,3); 1,3-dimethyl butadiene-1,3; 1-ethyl butadiene-1,3 (hexadiene-1,3); 1,4-dimethyl butadiene-1,3 (hexadiene-2,4); the copolymerization being effected by the usual manner of copolymerizing such monomeric materials as is described in more detail in United States Patents 2,356,128, 2,356,129, and 2,356,130 to Thomas and Sparks. Typical examples of these synthetic rubbers are known to the trade as "GR-I," "Butyl A," "Butyl B," "Butyl C," "Flexon," "GR- 150," "GR–115," "GR–117," "GR–118," etc. For purposes of brevity the copolymer will be referred to herein as "Butyl" rubber.

The curing or vulcanizing agent employed in the self-sealing composition may be sulfur, in which case a conventional accelerator such as mercaptobenzothiazole or any other common accelerator should also be used. The sulfur may be added to the composition in the form of elemental sulfur, or a compound which liberates sulfur on heating, such as tetramethyl thiuram disulfide, may be employed. In the latter case the sulfur-providing compound may also act as an accelerator of vulcanization, as is well known to the art. Whether the sulfur be provided in one or both forms mentioned above, the total amount of sulfur available for vulcanization should be about 0.2% to 1.0%, preferably from 0.3% to 0.6% by weight of the "Butyl" rubber.

It is preferred, however, to employ the so-called "sulfur-free" compositions, that is, those in which a curing agent comprising a substance containing a quinonoid nucleus is employed instead of sulfur, as described in detail in United States Letters Patent No. 2,393,321 to Haworth, granted January 22, 1946. Of these curing agents, p-quinone dioxime and p,p-di-benzoylquinone dioxime are preferred. Such curing agents should likewise be used in an amount from about 0.2% to 1.0% by weight of the "Butyl" rubber; if desired, these curing agents may be used in combination with sulfur, the total amount of curing agent being about 0.2% to 1.0% by weight of the "Butyl" rubber.

The auxiliary curing agents which may be employed in the sealing composition of the present invention comprise both organic and inorganic peroxides and polysulfides, and include among others lead peroxide, barium peroxide, zinc peroxide, copper peroxide, potassium peroxide, silver peroxide, sodium peroxide, calcium peroxide; metallic peroxyborates, peroxychromates, peroxycolumbates, peroxydicarbonates, peroxydiphosphates, peroxydisulfates, peroxygermanates, peroxymolybdates, peroxymonocarbonates, peroxymonophosphates, peroxymonosulfates, peroxynitrates, magnesium peroxide, sodium pyrophosphate peroxide, and the like; the organic peroxides such as caproyl peroxide, lauryl peroxide, heptoyl peroxide, capryl peroxide, nonyl peroxide, undecyl peroxide, tridecyl peroxide, myristyl peroxide, benzoyl peroxide and phenacetyl peroxide; the metallic polysulfides such as calcium polysulfide, sodium polysulfide, potassium polysulfide, barium polysulfide, and the like; and the organic polysulfides such as the alkyl polysulfides, aryl polysulfides, aralkyl polysulfides, aryl alkyl polysulfides, alkylaryl polsulfides which possess the general formula R—(S)$_x$—R where R is a hydrocarbon group and $x$ is a number from 2 to 4. It will be appreciated that many of these compounds are expensive or present some hazard both personal and processing in handling. Consequently, the preferred compounds of this class are zinc peroxide, lead peroxide and calcium polysulfide.

The auxiliary curing agent should be employed in amounts from 0.5% to 4.0% by weight of the "Butyl" rubber, preferably from 1.0% to 3.0%.

The black iron oxide which is also an essential ingredient of the sealing composition is normally referred to as ferri ferrous oxide, magnetite, or ferroso ferric oxide having a molecular weight of 231.92, a specific gravity of 5.18, and a particle size from 0.1 to 20 microns. It must be employed in amounts from 60% to 95% by weight of the "Butyl" rubber, preferably from 75% to 85% for best results.

The composition may include, in addition to the ingredients set forth above, any of the usual compounding ingredients for rubber compositions, such as antioxidants, softeners, tackifiers, pigment, fillers, reinforcing agents, etc., as is well understood by those skilled in the art. The composition is cured or vulcanized at ordinary vulcanization temperatures of 150° to 390° F. for 5 to 180 minutes or even longer to give the desired soft, cohesive product.

Such compositions possess a unique combination of properties which enable them to retain their plasticity and cohesiveness so as to enable them to seal punctures effectively even when stored or used under adverse conditions, such as at elevated temperatures over extensive periods of time, while on the other hand they are sufficiently stiff and form-retaining so that they do not flow excessively even under the influence of relatively large forces such as those encountered in a rapidly rotating pneumatic tire or inner tube.

Typical compositions will be described for the purpose of illustrating the invention, but it will be understood that the ratio of the essential ingredients may be varied within the ranges set forth above and that the other compounding materials may be replaced by and/or supplemented with such other materials as are commonly used in compounding "Butyl" rubber compositions and the amounts thereof may be varied in accordance with conventional compounding methods.

EXAMPLE I

| Material: | Parts by weight |
|---|---|
| Zinc peroxide | 2.0 |
| "Butyl" rubber (80:20 copolymer of isobutylene and isoprene) | 100.0 |
| Black iron oxid | 80.0 |
| Stearic acid | 3.0 |
| Zinc oxide | 6.0 |
| Paraquinone dioxime | 0.5 |
| Softeners (low molecular liquid weight polyisobutylene, high molecular weight polyisobutylene, paraffin oil) | 54.0 |
| Tackifying resin (non-reactive unmodified phenol formaldehyde type) | 13.0 |

EXAMPLE II

| Material: | Parts by weight |
|---|---|
| Calcium polysulfide | 2.0 |
| "Butyl" rubber (80:20 copolymer of isobutylene and isoprene) | 100.0 |
| Black iron oxid | 80.0 |
| Stearic acid | 3.0 |
| Zinc oxide | 6.0 |
| Paraquinone dioxime | 0.5 |
| Softeners (low molecular weight liquid polyisobutylene, high molecular weight polyisobutylene and paraffin base oil) | 54.0 |
| Tackifying resin (non-reactive unmodified phenol-formaldehyde type) | 13.0 |

EXAMPLE III

| Material: | Parts by weight |
|---|---|
| Lead peroxide | 2.0 |
| "Butyl" rubber (80:20 copolymer of isobutylene and isoprene) | 100.0 |
| Black iron oxide | 80.0 |
| Stearic acid | 3.0 |
| Zinc oxide | 6.0 |
| Paraquinone dioxime | 0.5 |
| Softeners (low molecular weight liquid polyisobutylene, high molecular weight polyisobutylene and paraffin base oil) | 54.0 |
| Tackifying resin (non-reactive, unmodified phenol-formaldehyde type) | 13.0 |

The iron oxide serves as a reinforcing agent and the softeners and tackifying resin serve to impart tackiness to the composition and to plasticize it. The above compositions can be prepared in the usual manner by mixing the components thereof on a mill or in an internal mixer. The self-sealing layer may be formed by calendering or extruding the composition or in any other manner as desired. After the compositions have been subjected to vulcanization at a temperature of from 250° to 390° F.

or higher for 4 to 180 minutes, the resulting partially vulcanized composition possesses excellent sealing properties and does not undergo plastic flow in the unconfined state even under the influence of considerable deformation stresses as is illustrated by the following tests.

Eight tubeless tires, size 7.10 x 15 were constructed in the following manner. A sealing layer prepared in two pieces so that the right half was of the composition of Example I and the left half for a control, was of a similar composition but did not contain zinc peroxide were spliced longitudinally and placed circumferentially around a building drum. Then the various plies, bead wire, side walls and tread were added. This composite article was removed from the drum, formed and vulcanized in a confined mold under pressure for 85 minutes at 295° F. Eight more tubeless tires were built and vulcanized in the same manner but the sealing layer was the composition of Example II for the right half and a similar composition which contained no calcium polysulfide for the left half was used as a control. Eight tires 7.10 x 15 were also built employing the composition of Example III for right half of sealing layer and a control, same composition but lead peroxide omitted, for left half. A set of four tires were mounted on automobile wheels and inflated to the correct pressure for that size tire and the load to be carried. The wheels with the inflated tires were mounted on automobiles and driven for a few miles. Then four tires of each set were driven over planks through which spikes had been driven so that all four tires on each automobile would receive several punctures. Then the punctured tires were driven for 140 miles at 60 miles per hour and the air pressure in the tires was checked, and the automobiles garaged overnight. The air pressure in the tires was checked again in the morning. The four other tires of each set which received no punctures were driven for five hours at 70 miles per hour. At the end of this driving test the tires were deflated, removed from the wheels and the sealing layer in each tire was inspected. The results of these abusive tests are listed in Table I.

Table I.—*Puncture and high speed driving test of sealing layer*

| Example No. | Tire Size | Sealing Layer Composition | | Puncture Test | | High Speed Driving Test | |
|---|---|---|---|---|---|---|---|
| | | Right Half Test | Left Half Control | 140 MI. at 60 M. P. H. | Overnight | Left | Right |
| IV | 7.10 x 15 | Composition of Example I, Zinc Peroxide. | Composition of Example I but Zinc Peroxide omitted. | No pressure loss. | No pressure loss. | Badly cracked and flowed in central section. | No cracks, no flow in this test section. |
| V | 7.10 x 15 | Composition of Example II, Calcium Polysulfide. | Composition of Example II but Calcium Polysulfide omitted. | ----do------- | 4.1% pressure loss. | Control badly cracked and flowed. | Negligible flow, no crack in test section. |
| VI | 7.10 x 15 | Composition of Example III, Lead Peroxide. | Composition of Example III but Lead Peroxide omitted. | ----do------- | No pressure loss. | ----do-------- | No flow, no crack in this test section. |

An article embodying this invention is readily assembled from a minimum number of component parts and the finished article is light-weight and does not suffer from excessive heat build-up in service. The sealing layer has sufficient strength that it undergoes no appreciable plastic flow under the influence of deformation stresses, and when a single unconfined layer of sealing composition is used, it does not stiffen or crack when subjected to elevated temperatures. When the wall of the article is punctured, the opening is quickly closed by the sealing layer which also seals about the punctured object. The sealing layer has little tendency to lose its sealing property since it is inherently resistant to change in its properties.

The invention has been described in considerable detail with reference to a few embodiments and to a few specific sealing compositions but it wil be understood that variations and modifications may be employed without departing from the spirit and scope of this invention as defined in the appended claims.

I claim:

1. A self-sealing composition for use in such articles as pneumatic tires and tire inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of a curing agent for said copolymer and in the presence of an auxiliary curing agent for said copolymer selected from the group consisting of organic peroxides, inorganic peroxides and metallic polysulfides.

2. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of an auxiliary curing agent for said copolymer selected from the group consisting of organic peroxides, inorganic peroxides and metallic polysulfides.

3. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of a metallic peroxide.

4. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of p-quinone dioxime and in the presence of 0.5 to 4% by weight of said copolymer of a metallic peroxide.

5. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of p-quinone dioxime and in the presence of 0.5 to 4% by weight of said copolymer of zinc peroxide.

6. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of zinc peroxide.

7. A self-sealing composition for use in such articles as pneumatic tires and inner tubes comprising a rubbery copolymer of a major proportions of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of lead peroxide.

8. A self-sealing composition for use in such articles as pneumatic tires and inner tubes comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of calcium polysulfide.

9. A laminated article comprising a layer of material susceptible to puncture and adhered to said layer in face-to-face relation, a layer of self-sealing composition comprising a rubbery copolymer of a major proportion of an isoolefin having 4 to 7 carbon atoms with a minor proportion of an open-chain conjugated diolefin having 4 to 8 carbon atoms, and from 60 to 95% by weight of said copolymer of black iron oxide, said copolymer having been cured to a partially cured state in the presence of a curing agent for said copolymer and in the presence of an auxiliary curing agent for said copolymer selected from the group consisting of organic peroxides, inorganic peroxides and metallic polysulfides.

10. A self-sealing article such as an inner tube and the like comprising a wall member of a vulcanized rubber composition and a self-sealing composition adhered to the inner face of said wall member, said self-sealing composition comprising a rubbery copolymer of a major proportion of an isoolefin having 4 to 7 carbon atoms with a minor proportion of an open-chain conjugated diolefin having 4 to 8 carbon atoms and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of an auxiliary curing agent for said copolymer selected from the group consisting of organic peroxides, inorganic peroxides and metallic polysulfides.

11. A self-sealing tire casing of the tubeless variety comprising a tread member, a carcass member, a flexible barrier layer impermeable to air extending over the inner face of said carcass member from bead portion to bead portion, and a layer of self-sealing composition adhered to the inner face of said barrier layer in the crown region of said tire casing, said self-sealing composition comprising a rubbery copolymer of a major proportion of an isoolefin having 4 to 7 carbon atoms with a minor proportion of an open-chain conjugated diolefin having 4 to 8 carbon atoms and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of an auxiliary curing agent for said copolymer selected from the group consisting of organic peroxides, inorganic peroxides and metallic polysulfides.

12. A self-sealing tire casing of the tubeless variety comprising a tread member, a carcass member, a flexible barrier layer impermeable to air extending over the inner face of said carcass member from bead portion to bead portion, and a layer of self-sealing composition adhered to the inner face of said barrier layer in the crown region of said tire casing, said self-sealing composition comprising a rubbery copolymer of a major proportion of an isoolefin having 4 to 7 carbon atoms with a minor proportion of an open-chain conjugated diolefin having 4 to 8 carbon atoms and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of zinc peroxide.

13. A self-sealing tire casing of the tubeless variety comprising a tread member, a carcass member, a flexible barrier layer impermeable to air extending over the inner face of said carcass member from bead portion to bead portion, and a layer of self-sealing composition adhered to the inner face of said barrier layer in the crown region of said tire casing, said self-sealing composition comprising a rubbery copolymer of a major proportion of an isoolefin having 4 to 7 carbon atoms with a minor proportion of an open-chain conjugated diolefin having 4 to 8 carbon atoms and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of lead peroxide.

14. A self-sealing tire casing of the tubeless variety comprising a tread member, a carcass member, a flexible barrier layer impermeable to air extending over the inner face of said carcass member from bead portion to bead portion, and a layer of self-sealing composition adhered to the inner face of said barrier layer in the crown region of said tire casing, said self-sealing composition comprising a rubbery copolymer of a major proportion of an isoolefin having 4 to 7 carbon atoms with a minor proportion of an open-chain conjugated diolefin having 4 to 8 carbon atoms and from 60 to 95% by weight of said copolymer of black iron oxide, said copolymer having been cured to a partially cured state in the presence of about 0.2 to 1.0% by weight of said copolymer of a curing agent for said copolymer and in the presence of 0.5 to 4% by weight of said copolymer of calcium polysulfide.

References Cited in the file of this patent

UNITED STATES PATENTS

| | | |
|---|---|---|
| 2,393,321 | Haworth | Jan. 22, 1946 |
| 2,462,674 | Rehner et al. | Feb. 22, 1949 |
| 2,541,550 | Sarbach et al. | Feb. 13, 1951 |
| 2,566,384 | Tilton | Sept. 4, 1951 |
| 2,583,387 | Morrissey et al. | Jan. 22, 1952 |
| 2,587,470 | Herzegh | Feb. 26, 1952 |
| 2,655,195 | Curtis | Oct. 13, 1953 |
| 2,666,753 | Zapp | Jan. 19, 1954 |

FOREIGN PATENTS

| | | |
|---|---|---|
| 381,890 | Great Britain | Oct. 13, 1932 |

OTHER REFERENCES

Compounding Ingredients For Rubber, 2nd Ed., India Rubber World, page 366 (1947).